US012068943B2

(12) United States Patent
Jiang et al.

(10) Patent No.: US 12,068,943 B2
(45) Date of Patent: Aug. 20, 2024

(54) METHOD FOR MEASURING NETWORK INTERNATIONAL OUTLET INTERFACES OF DESIGNATED AREA

(71) Applicant: Guangzhou University, Guangzhou (CN)

(72) Inventors: Yu Jiang, Guangzhou (CN); Binxing Fang, Guangzhou (CN); Yanbin Sun, Guangzhou (CN); Zhihong Tian, Guangzhou (CN); Mohan Li, Guangzhou (CN); Deshun Zeng, Guangzhou (CN)

(73) Assignee: GUANGZHOU UNIVERSITY, Guangzhou (CN)

( * ) Notice: Subject to any disclaimer, the term of this patent is extended or adjusted under 35 U.S.C. 154(b) by 0 days.

(21) Appl. No.: 18/351,380

(22) Filed: Jul. 12, 2023

(65) Prior Publication Data
US 2024/0098011 A1    Mar. 21, 2024

(30) Foreign Application Priority Data

Jul. 13, 2022 (CN) .......................... 202210817856.2

(51) Int. Cl.
*H04L 45/02*    (2022.01)
*H04L 41/12*    (2022.01)

(52) U.S. Cl.
CPC .............. *H04L 45/02* (2013.01); *H04L 41/12* (2013.01)

(58) Field of Classification Search
CPC ................................ H04L 45/02; H04L 41/12
See application file for complete search history.

(56) References Cited

U.S. PATENT DOCUMENTS

2006/0165013 A1\* 7/2006 Previdi ................... H04L 45/03
                                                                 370/254
2022/0360556 A1\* 11/2022 Kamiya .............. H04L 63/0236

FOREIGN PATENT DOCUMENTS

CN          108848203 A  \* 11/2018    ............. H04L 43/04

\* cited by examiner

*Primary Examiner* — Tonia L Dollinger
*Assistant Examiner* — Joseph M Cousins
(74) *Attorney, Agent, or Firm* — Getech Law LLC; Jun Ye

(57) ABSTRACT

The present disclosure relates to the technical field of Internet, in particular to a method for measuring network international outlet interfaces of a designated area. The method includes the following steps: acquiring a designated collection of routing interface paths and area location information of IP addresses of routing interface nodes; dividing the collected routing interface paths into critical hop complete paths and critical hop missing paths; determining whether a routing interface path is a critical hop complete path; using a 2-tuple to identify network international outlet interfaces of the routing interface path; and counting the quantity of the network international outlet interfaces of the measured area.

9 Claims, 3 Drawing Sheets

| Hop Count | Part of Routing Paths | Location Area |
|---|---|---|
| 11 | 202. 97. 93. 158 | China |
| 12 | 183. 91. 56. 126 | China |
| 13 | 129. 250. 2. 93 | America |

| Hop Count | Part of Routing Paths | Location Area |
|---|---|---|
| 9 | 202. 97. 57. 25 | China |
| * | * | * |
| 11 | 202. 97. 61. 162 | Singapore |
| 12 | 183. 91. 56. 122 | China |

METHOD FOR MEASURING NETWORK INTERNATIONAL OUTLET INTERFACES OF DESIGNATED AREA

TECHNICAL FIELD

The present disclosure relates to the technical field of Internet, in particular to a method for measuring network international outlet interfaces of a designated area.

BACKGROUND

The Internet is a worldwide computer network formed by different types and sizes of independently operated and managed computer networks that connect different organizations in different countries through communication lines such as ordinary telephone lines, high speed rate private lines, and fiber optic cables. Since the start of large-scale computer network projects, on the premise of conforming to the Internet protocol, there are two main forms of network interconnection between countries. One form is direct network connection, for example, there is a direct submarine cable connection between two countries. The other form is indirect connection through route selection. The above two forms involve cross-regional data transfer that refers to completing an operation of transferring data in an area out of the area through network international outlets of the area. The area here refers to a country or a region, marked by a national-level top-level domain.

At present, there is no effective method in the public domain to measure the quantity of network international outlet interfaces in an area. In order to facilitate researchers to deeply understand the situation of network international outlet interfaces in an area, a measurement method capable of acquiring network international outlet interfaces in an area and the quantity of the network international outlet interfaces is required.

SUMMARY

(1) Technical Problems Solved

In view of the shortcomings in the prior art, the present disclosure provides a method for measuring network international outlet interfaces of a designated area. The method has the advantages that different identification methods are used for different types of network international outlet interfaces and measurement data has good accuracy, in order to solve the problem that there is no effective method to measure the quantity of network international outlet interfaces of an area in the public domain.

(2) Technical Solutions

In order to achieve the purposes that different identification methods are used for different types of network international outlet interfaces and measurement data has good accuracy, the present disclosure provides the following technical solutions:

A method for measuring network international outlet interfaces of a designated area includes the following steps:

S1, acquiring a designated collection of routing interface paths and area location information of IP addresses of routing interface nodes;

S2, dividing the collected routing interface paths into critical hop complete paths and critical hop missing paths;

S3, determining whether a routing interface path is a critical hop complete path;

S4, using a 2-tuple to identify network international outlet interfaces of the routing interface path; and S5, counting the quantity of the network international outlet interfaces of the measured area.

Preferably, in step S1, an existing collection of routing interface paths between an inside and outside of the measured area and the area location information of the IP addresses of the routing interface nodes in the collection of paths are acquired.

Preferably, in step S2, the critical hop complete routing interface path refers to that in the routing interface path, a previous hop of routing interface node is located within the measured area and a next hop of routing interface node is located outside the measured area, with no hop of routing interface node being missing between the two hops of routing interface nodes.

Preferably, in step S2, the critical hop missing routing interface path refers to missing of part of hops of routing interface nodes after a certain hop of routing interface node in the measured area, and then hopping to a routing interface node located outside the measured area.

Preferably, in step S4, in the case that the routing interface path is a critical hop complete path, a 2-tuple <a Dot-decimal notation form of a binary 16-bit prefix of the IP address of a last hop of routing interface node within the measured area, the area location information of the IP address of the first hop of routing interface node outside the measured area> is used to identify the network international outlet interfaces of the path.

Preferably, in step S4, in the case that the routing interface path is a critical hop missing path, a 2-tuple <a Dot-decimal notation form of a binary 16-bit prefix of the IP address of a first hop of routing interface node outside the measured area, the area location information of the IP address of the first hop of routing interface node outside the measured area> is used to represent possible network international outlet interfaces of the path.

Preferably, in the case that the IP address of the first hop of routing interface node outside the measured area in the critical hop missing routing interface path is managed by operating agencies within the whole measured area, the network international outlet interfaces of the routing interface path are identified, and the operation in step S5 is proceeded.

Preferably, in the case that the IP address of the first hop of routing interface node outside the measured area in the critical hop missing routing interface path is not managed by operating agencies within the whole measured area, the network international outlet interfaces of the routing interface path are ignored, and the operation in step S5 is performed.

Preferably, in step S5, 2-tuple records identified from the collection of routing interface paths are collected, and the 2-tuple records are de-duplicated, as identical 2-tuple records indicate that a plurality of routing interface paths pass through the same network international outlet interface; and the quantity of different 2-tuple records is then counted to obtain the quantity of the network international outlet interfaces in the measured area.

(3) Beneficial Effects

Compared with the prior art, the method for measuring the network international outlet interfaces according to the present disclosure has the following beneficial effects:

1. On the one hand, in the 2-tuple format designed by the measurement method, a first component of the tuple is the Dot-decimal notation form of the binary 16-bit prefix of the IP addresses of the critical hop routing interface nodes, which is conducive to reducing the impact of the situation of international network line bundling on measurement results; on the other hand, according to the present disclosure, the routing interface paths are divided in a fine-grained manner, and different identification methods are used for different types of network international outlet interfaces, thereby improving the measurement accuracy.

2. The direct network connection between the measured area and other areas is clearly reflected: each network international outlet interface identified by the present disclosure includes information about other areas having the direct network connection with the measured area.

DETAILED DESCRIPTION OF EMBODIMENTS

The technical solutions in the embodiments of the present disclosure will be clearly and completely described below with reference to the accompanying drawings in the embodiments of the present disclosure. Apparently, the described embodiments are only a part of the embodiments of the present disclosure, rather than all the embodiments. Based on the embodiments of the present disclosure, all other embodiments obtained by a person of ordinary skill in the art without creative efforts shall fall within the protection scope of the present disclosure.

Embodiment 1

Referring to FIG. 1 to FIG. 5, a method for measuring network international outlet interfaces of a designated area includes the following steps:
  S1, acquire a designated collection of routing interface paths and area location information of IP addresses of routing interface nodes.
  S2, divide the collected routing interface paths into critical hop complete paths and critical hop missing paths.
  S3, determine whether a routing interface path is a critical hop complete path.
  S4, in the case that the routing interface path is a critical hop complete path, use a 2-tuple <a Dot-decimal notation form of a binary 16-bit prefix of the IP address of a last hop of routing interface node within the measured area, the area location information of the IP address of a first hop of routing interface node outside the measured area> to record network international outlet interfaces of the path.
  S5, count the network international outlet interfaces of the critical hop complete routing interface path.

In step S1, an existing collection of routing interface paths between an inside and outside of the measured area and the area location information of the IP addresses of the routing interface nodes in the collection of paths are acquired.

In step S2, the critical hop complete routing interface path refers to that in the routing interface path, a previous hop of routing interface node is located within the measured area and a next hop of routing interface node is located outside the measured area, with no hop of routing interface node being missing between the two hops of routing interface nodes. The critical hop missing routing interface path refers to missing of part of hops of routing interface nodes after a certain hop of routing interface node within the measured area, and then hopping to a routing interface node located outside the measured area.

In step S5, 2-tuple records identified from the collection of routing interface paths are collected, and the 2-tuple records are de-duplicated, as identical 2-tuple records indicate that a plurality of routing interface paths pass through the same network international outlet interface; and the quantity of different 2-tuple records is then counted to obtain the quantity of the network international outlet interfaces of the critical hop complete routing interface path.

Figures 1, 2:
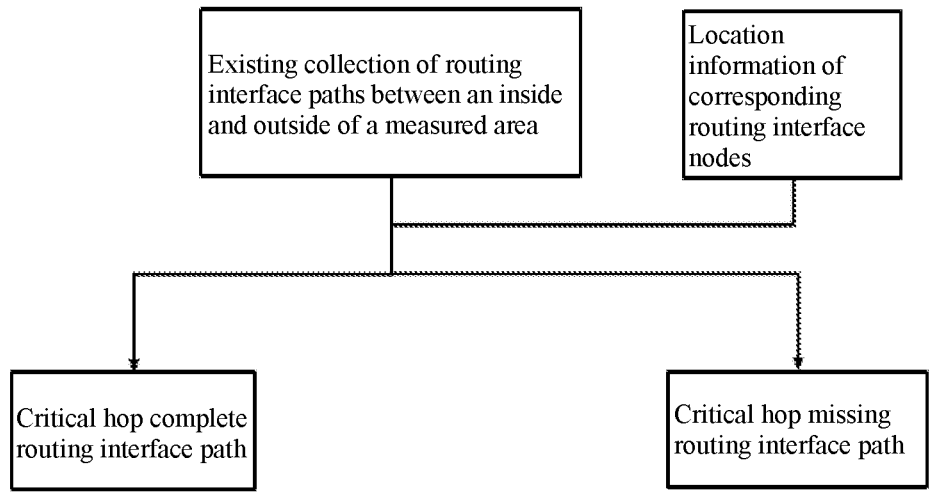
FIG. 1 is a schematic diagram of classification of routing interface paths according to an embodiment of the present disclosure.
FIG. 2 is a schematic diagram of part of critical hop complete routing interface paths according to an embodiment of the present disclosure.
Figures 3, 4:
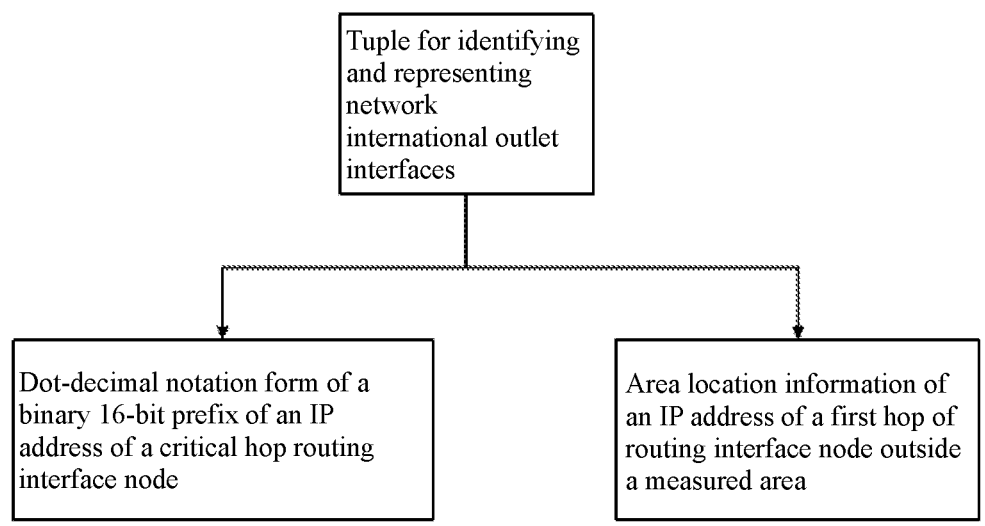
FIG. 3 is a schematic diagram of part of critical hop missing routing interface paths according to an embodiment of the present disclosure.
FIG. 4 is a schematic diagram of network international outlet interfaces for identifying and representing a routing interface path according to an embodiment of the present disclosure.
Figure 5:
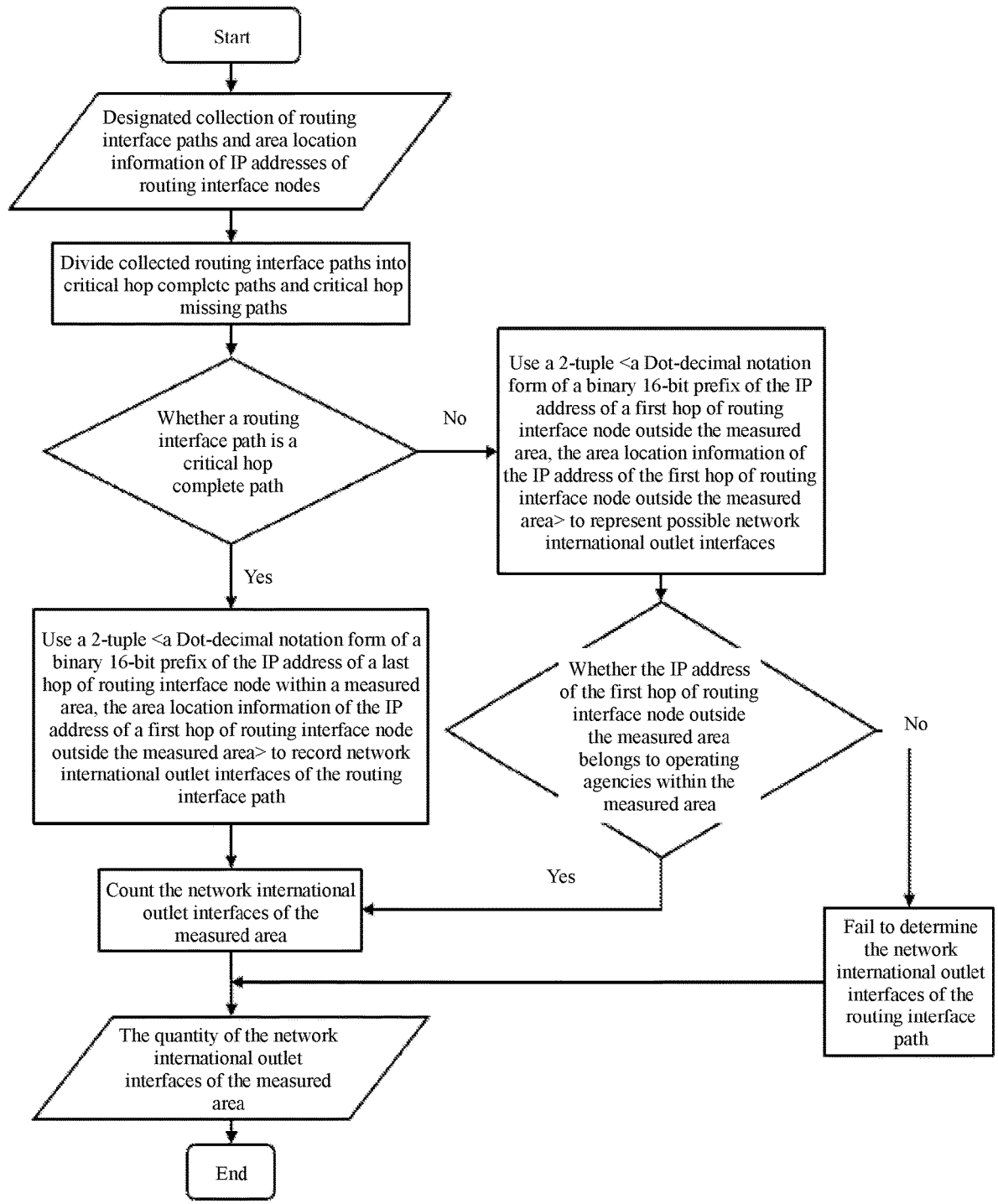
FIG. 5 is an overall flow diagram of a method according to an embodiment of the present disclosure.

(1) The designated 2-tuple format is used to represent the network international outlet interfaces included in the routing interface path. A first component of the tuple uses the dotted-decimal notation form of the binary 16-bit prefix of the IP address of the critical hop routing interface node, and a second component of the tuple uses the area location information of the IP address of the first hop of routing interface node outside the measured area, as shown in FIG. 4, where each 2-tuple record represents a network international outlet interface. Different routing interface nodes may be selected for the first component of the tuple to identify network international outlet interfaces in the critical hop complete case and the critical hop missing case.

(2) For a critical hop complete routing interface path, a 2-tuple <the Dot-decimal notation form of the binary 16-bit prefix of the IP address of the last hop of routing interface node within the measured area, the area location information of the IP address of the first hop of routing interface node outside the measured area> is used to represent the network international outlet interfaces of the routing interface path. For example, a routing interface path includes such two adjacent routing interface nodes: the IP address of the former routing interface node is 202.97.93.x, which locates a country; the IP address of the latter routing interface node is 183.91.56.x, which locates a city in the country, then a 2-tuple <202.97, the city in the country> may be used to record the network international outlet interfaces of the routing interface path.

Embodiment 2

A method for measuring network international outlet interfaces of a designated area includes the following steps:
  S1, acquire a designated collection of routing interface paths and area location information of IP addresses of routing interface nodes.
  S2, divide the collected routing interface paths into critical hop complete paths and critical hop missing paths.

S3, determine whether a routing interface path is a critical hop complete path.

S4, in the case that the routing interface path is a critical hop missing path, use a 2-tuple <a Dot-decimal notation form of a binary 16-bit prefix of the IP address of a first hop of routing interface node outside the measured area, the area location information of the IP address of the first hop of routing interface node outside the measured area> to represent possible network international outlet interfaces of the path.

S5, count the network international outlet interfaces of the critical hop missing routing interface path.

In step S1, an existing collection of routing interface paths between an inside and outside of the measured area and the location information of the IP addresses of the routing interface nodes in the collection of paths are acquired.

In step S2, the critical hop complete routing interface path refers to that in the routing interface path, a previous hop of routing interface node is located within the measured area and a next hop of routing interface node is located outside the measured area, with no hop of routing interface node being missing between the two hops of routing interface nodes. The critical hop missing routing interface path refers to missing of part of hops of routing interface nodes after a certain hop of routing interface node in the measured area, and then hopping to a routing interface node located outside the measured area.

In step S4, in the case that the IP address of the first hop of routing interface node outside the measured area in the critical hop missing routing interface path is managed by operating agencies within the whole measured area, the network international outlet interfaces of the routing interface path are identified, and the operation in step S5 is proceeded. In the case that the IP address of the first hop of routing interface node outside the measured area in the critical hop missing routing interface path is not managed by the operating agencies within the whole measured area, the network international outlet interfaces of the routing interface path are ignored, and the operation in step S5 is performed.

In step S5, 2-tuple records identified from the collection of routing interface paths are collected, and the 2-tuple records are de-duplicated, as identical 2-tuple records indicate that a plurality of routing interface paths pass through the same network international outlet interface; and the quantity of different 2-tuple records is then counted to obtain the quantity of the network international outlet interfaces of the critical hop missing routing interface path.

(1) The designated 2-tuple format is used to represent the network international outlet interfaces included in the routing interface path. A first component of the tuple uses the dotted-decimal notation form of the binary 16-bit prefix of the IP address of the critical hop routing interface node, and a second component of the tuple uses the area location information of the IP address of the first hop of routing interface node outside the measured area, as shown in FIG. 4, where each 2-tuple record represents a network international outlet interface. Different routing interface nodes may be selected for the first component of the tuple to identify network international outlet interfaces in the critical hop complete case and the critical hop missing case.

(2) For the critical hop missing routing interface path, a 2-tuple <the Dot-decimal notation form of the binary 16-bit prefix of the IP address of the first hop of routing interface node outside the measured area, the area location information of the IP address of the first hop of routing interface node outside the measured area> is used to represent possible network international outlet interfaces of the path. Then, whois information is used to determine whether the IP address of the first hop of routing interface node outside the measured area in the critical hop missing routing interface path is managed by the operating agencies within the measured area. In the case that the IP address of the routing interface path is managed by the operating agencies within the measured area, the 2-tuple record is determined as a network international outlet interface. In the case that the IP address of the routing interface path is not managed by the operating agencies within the whole measured area, it means that the routing interface path is in a seriously missing manner, and the network international outlet interfaces of the routing interface path may not be identified, so the network international outlet interfaces of the routing interface path are ignored. For example, a routing interface path includes the following cases: the IP address of the former routing interface node is 202.97.57.x, which locates a city in a country, the IP address of the latter routing interface node is 202.97.61.x, which locates Singapore, with missing routing interface nodes between the two routing interface nodes, and meanwhile, the address of 202.97.61.x is managed by Telecom in the country, so a 2-tuple <202.97, Singapore> may be used to represent a network international outlet interface of the routing interface path.

Firstly, in the 2-tuple format designed by the measurement method, the first component of the tuple is the Dot-decimal notation form of the binary 16-bit prefix of the IP addresses of the critical hop routing interface nodes, which is conducive to reducing the impact of the situation of international network line bundling on measurement results. Secondly, according to the present disclosure, the routing interface paths are divided in a fine-grained manner, and different identification methods are used for different types of network international outlet interfaces, thereby improving the measurement accuracy. Finally, each network international outlet interface identified by the present disclosure includes information about other areas having the direct network connection with the measured area.

According to the present disclosure, on the one hand, in the 2-tuple format designed by the measurement method, the first component of the tuple is the Dot-decimal notation form of the binary 16-bit prefix of the IP addresses of the critical hop routing interface nodes; on the other hand, the routing interface paths are divided in a fine-grained manner, and different identification methods are used for different types of network international outlet interfaces, thereby improving the measurement accuracy.

While the embodiments of the present disclosure have been shown and described, it may be understood by a person skilled in the art that various changes, modifications, substitutions and alterations may be made to these embodiments without departing from the principles and spirit of the present disclosure, the scope of which is defined by the appended claims and their equivalents.

The invention claimed is:

1. A method for measuring network international outlet interfaces of a designated area, comprising the following steps:

S1, acquiring a designated collection of routing interface paths and area location information of IP addresses of routing interface nodes;

S2, dividing the collected routing interface paths into critical hop complete routing interface paths and critical hop missing routing interface paths;

S3, determining whether a routing interface path is a critical hop complete routing interface path;

S4, using a 2-tuple to identify network international outlet interfaces of the routing interface path; and S5, counting the quantity of the network international outlet interfaces of the measured area.

2. The method for measuring network international outlet interfaces of a designated area according to claim 1, wherein in step S1, an existing collection of routing interface path between an inside and outside of the measured area and the area location information of the IP addresses of the routing interface nodes in the collection of paths are acquired.

3. The method for measuring network international outlet interfaces of a designated area according to claim 1, wherein in step S2, the critical hop complete routing interface path refers to that in the routing interface path, a previous hop of routing interface node is located within the measured area and a next hop of routing interface node is located outside the measured area, with no hop of routing interface node being missing between the two hops of routing interface nodes.

4. The method for measuring network international outlet interfaces of a designated area according to claim 1, wherein in step S2, a critical hop missing routing interface path refers to missing of part of hops of routing interface nodes after a certain hop of routing interface node in the measured area, and then hopping to a routing interface node located outside the measured area.

5. The method for measuring network international outlet interfaces of a designated area according to claim 1, wherein in step S4, in a case that the routing interface path is a critical hop complete routing interface path, a 2-tuple <a Dot-decimal notation form of a binary 16-bit prefix of the IP address of a last hop of routing interface node within the measured area, the area location information of the IP address of the first hop of routing interface node outside the measured area> is used to identify the network international outlet interfaces of the path.

6. The method for measuring network international outlet interfaces of a designated area according to claim 5, wherein in a case that the IP address of the first hop of routing interface node outside the measured area in the critical hop missing routing interface path is managed by operating agencies within the whole measured area, the network international outlet interfaces of the routing interface path are identified, and then the operation in step S5 is proceeded.

7. The method for measuring network international outlet interfaces of a designated area according to claim 5, wherein in a case that the IP address of the first hop of routing interface node outside the measured area in the critical hop missing routing interface path is not managed by operating agencies within the whole measured area, the network international outlet interfaces of the routing interface path are ignored, and the operation in step S5 is performed.

8. The method for measuring network international outlet interfaces of a designated area according to claim 1, wherein in step S4, in a case that the routing interface path is a critical hop missing routing interface path, a 2-tuple <a Dot-decimal notation form of a binary 16-bit prefix of the IP address of a first hop of routing interface node outside the measured area, the area location information of the IP address of the first hop of routing interface node outside the measured area> is used to represent possible network international outlet interfaces of the path.

9. The method for measuring network international outlet interfaces of a designated area according to claim 1, wherein in step S5, 2-tuple records identified from the collection of routing interface paths are collected, and the 2-tuple records are de-duplicated, as identical 2-tuple records indicate that a plurality of routing interface paths pass through the same network international outlet interface; and the quantity of different 2-tuple records is then counted to obtain the quantity of the network international outlet interfaces in the measured area.

* * * * *